US011149571B2

(12) United States Patent
Delahaye et al.

(10) Patent No.: US 11,149,571 B2
(45) Date of Patent: Oct. 19, 2021

(54) GUIDING RING FOR VARIABLE-PITCH BLADES AND METHOD OF MOUNTING SAID RING

(71) Applicant: SAFRAN AIRCRAFT ENGINES, Paris (FR)

(72) Inventors: Thomas Nolwenn Emmanuel Delahaye, Courtomer (FR); Kamel Benderradji, Livry-sur-Seine (FR); Delphine Hermanee Maxime Parent, Montrouge (FR); Sandrine Hélène Quevreux, Ballainvilliers (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 139 days.

(21) Appl. No.: 16/541,757

(22) Filed: Aug. 15, 2019

(65) Prior Publication Data

US 2020/0056494 A1     Feb. 20, 2020

(30) Foreign Application Priority Data

Aug. 17, 2018   (FR) ........................... 1857532

(51) Int. Cl.
*F01D 9/04*     (2006.01)
*F01D 5/03*     (2006.01)
(Continued)

(52) U.S. Cl.
CPC ............... *F01D 9/042* (2013.01); *B64F 5/10* (2017.01); *F01D 5/03* (2013.01); *F01D 5/20* (2013.01)

(58) Field of Classification Search
CPC ...... F01D 9/042; F01D 11/001; F01D 17/162; F04D 29/056; F04D 29/323; F04D 29/563; F05D 2260/33

See application file for complete search history.

(56) References Cited

U.S. PATENT DOCUMENTS 4,897,021 A * 1/1990 Chaplin ................... F01D 5/22
                                                    415/173.7
6,887,035 B2 * 5/2005 Bruce .................. F04D 29/057
                                                    415/160
(Continued)

FOREIGN PATENT DOCUMENTS

DE    10 2013 217 502 A1    3/2015
EP         0 146 449 A1     6/1985
(Continued)

OTHER PUBLICATIONS

French Office Action and Written Opinion dated Apr. 9, 2019, issued in French Application No. FR1857532, filed Aug. 17, 2018, 7 pages.

*Primary Examiner* — Woody A Lee, Jr.
*Assistant Examiner* — Brian O Peters
(74) *Attorney, Agent, or Firm* — Christensen O'Connor Johnson Kindness PLLC

(57) ABSTRACT

A ring for guiding variable-pitch blades and supporting an abradable coating for an aircraft turbomachine ring extends about an axis (X) and includes substantially radial orifices for mounting guiding sleeves intended each to receive a pivot of one of the blades. The ring may include a radially inner crown divided into sectors and supports the abradable coating. A radially outer annular ferrule may be divided into sectors and include the orifices for mounting the sleeves. In some embodiments, each ferrule sector is mounted about a crown sector by a circumferential sliding connection. The crown sector may include an immobilizer for rotationally immobilizing the sleeves of this ferrule sector about the axis.

11 Claims, 2 Drawing Sheets

(51) Int. Cl.
*F01D 5/20* (2006.01)
*B64F 5/10* (2017.01)

(56) References Cited

U.S. PATENT DOCUMENTS

| | | | |
|---|---|---|---|
| 10,738,620 B2* | 8/2020 | Anderson | F01D 11/08 |
| 2011/0176913 A1* | 7/2011 | Wassynger | F02C 6/12 |
| | | | 415/159 |

FOREIGN PATENT DOCUMENTS

| | | |
|---|---|---|
| EP | 0 696 675 A1 | 2/1996 |
| FR | 2 775 731 A1 | 10/1999 |

* cited by examiner

GUIDING RING FOR VARIABLE-PITCH BLADES AND METHOD OF MOUNTING SAID RING

TECHNICAL FIELD

This disclosure concerns the variable-pitch blade wheels in a turbomachine, particularly holding the variable-pitch blades.

BACKGROUND

The turbomachine compressors may include rectifiers with variable-pitch blades to adapt the operation of the rectifier to the operating conditions of the turbomachine.

In such a case, the blades of the rectifier are movable around radial axes mounted externally on the casing of the compressor and internally on an inner ring. The assembly maintains the alignment of the annular row of blades of the rectifier. In some instances, the control system of the pitch of the blades is mounted on the casing, the inner ring is then configured to let the axes of the blades rotate. It is therefore necessary to provide devices to support the friction associated with the pivoting of the shafts of the blades that are inserted into the ring structure so as not to damage the integrity of this structure.

In addition to its structural and mechanical functions with respect to the blades of the rectifier, the inner ring supports sealing means that cooperate with ferrules of the rotor line located radially inside the ring. This device prevents gas leaks between the successive compressor stages. Examples of such devices are provided in documents DE 10 2013 217502 A1, EP 0 146 449 A1, EP 0 696 675 A1 and FR 2 775 731.

For the optimization of the turbomachines, there is a need to increase the radius of the ferrules of the rotor line. The space reserved for the inner ring of the rectifier with the sealing means is therefore very limited.

In addition, it is important to consider the mounting constraints of the compressor. The rotor line and the rectifiers form two structures intertwined that must be precisely adjusted. The inner ring of the rectifier is not accessible when the assembly is mounted. There is therefore a need to design a system in which the various elements can be assembled before the final mounting.

The purpose of the disclosure is to propose a solution for producing an inner ring of a turbomachine stage with variable-pitch blades that meets both the design constraints mentioned above and the mounting constraints on the turbomachine.

SUMMARY

The disclosure concerns a ring for guiding variable-pitch blades and supporting an abradable coating for an aircraft turbomachine. This ring extends about an axis and comprising substantially radial orifices in which are mounted guiding sleeves intended each to receive a pivot of one of the blades. The guiding ring may include a radially inner crown which is divided into sectors and supports the abradable coating and a radially outer annular ferrule which is divided into sectors and comprises the orifices for mounting the sleeves. In some embodiments, each ferrule sector may be mounted about a crown sector by a circumferential sliding connection, the crown sector comprising means for immobilizing in rotation the sleeves of this ferrule sector about the axis.

In some embodiments, each crown sector comprises a cylindrical tab configured to be engaged in a transverse notch of the sleeves of each ferrule sector mounted around this crown sector, for the immobilizing in rotation of the sleeves.

Mounting by circumferential sliding the part of the ring accommodating the shafts of the blades of the rectifier on the part of the ring supporting the abradable reduces the radial extension of the inner guiding ring and thus frees up space to form the seal with the rotor passing inside the ring. In addition, by installing the means (immobilizer) for immobilizing the sleeves on the inner crown sector, the radial extension of the inner guiding ring can be further reduced.

In some embodiments, the cylindrical tab cooperates with a complementary cylindrical groove provided in the ferrule sector, forming an element of the circumferential sliding connection of the ferrule sector around the crown sector. This configuration is very compact.

Each crown sector may comprise a substantially cylindrical or frustoconical wall supporting the abradable coating which is connected by a first axial end to a first annular wall and by a second axial end to a second annular wall. In some embodiments, the cylindrical tab may be supported by the first annular wall and extend towards the second annular wall.

In some embodiments, the first and second annular walls define between them an annular space in which the ferrule sectors are at least partially housed.

These annular walls allow the space under the ferrule sectors to be closed axially and prevent axial leaks of the primary flow at the inner guiding ring.

Preferably, the quantity of crown sectors is less than the quantity of ferrule sectors and at least two ferrule sectors are mounted on each crown sector.

The crown sectors form the framework of the inner guiding ring and the ferrule sectors can be mounted on it by circumferential sliding to form ring sectors which will then be assembled around the rotor of the turbomachine, to form a rectifier for example.

In some embodiments, the crown comprises two semi-circular crown sectors and the ferrule comprises at least six, and preferably ten, ferrule sectors, one half of which is supported by each crown sector.

In some embodiments, each crown sector comprises a radially outer cylindrical surface and/or a radial annular support surface configured to cooperate with one or more complementary annular surfaces of each ferrule sector.

The disclosure also concerns a method of mounting such a ring. The method may include mounting the sleeves in the orifices in the ferrule sectors. The method may further include mounting the ferrule sectors by circumferential sliding around the crown sectors, to ensure the sleeves are in rotational immobilization about their axes of revolution.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Figure 1:
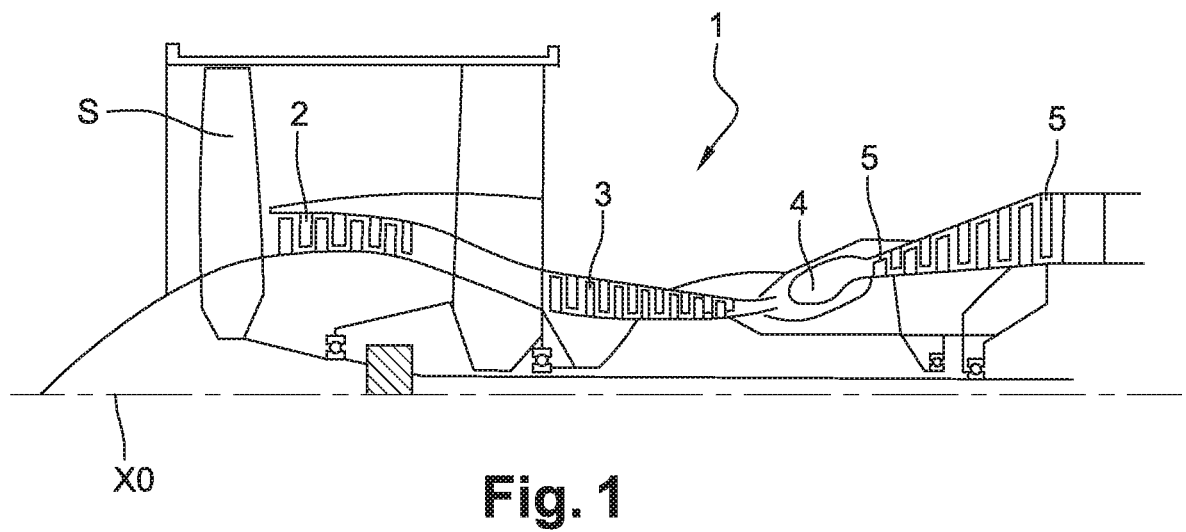
FIG. 1 schematically shows a half axial section of an aircraft engine.

An example of an aircraft engine concerned by the present disclosure, of the dual-flow turbomachine type, is shown in FIG. 1. In this document, the upstream and downstream are understood with respect to the direction of air flow along the axis X0 of the engine. The engine comprises upstream a fan propeller S driving the incoming air flow which then separates into a secondary flow, passing around the engine compartment 1 and in a primary flow entering the engine compartment 1. The primary flow passes through a first compressor, called a low-pressure compressor 2, then a second compressor, called a high-pressure compressor 3, before entering the combustion chamber 4, then driving several turbine stages 5.

The present disclosure concerns a rectifier stage with an annular row of variable-pitch blades which is located, for example, in the high-pressure compressor 3 of FIG. 1. The high-pressure compressor 3 is compact with a small diameter, which constrains the design of the elements to be installed therein.

Figure 2:
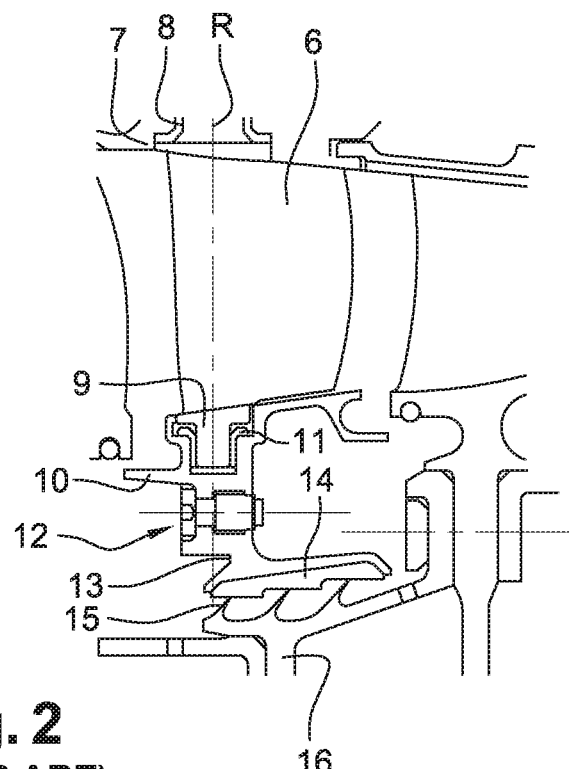
FIG. 2 schematically shows a half axial section of a rectifier for an engine compressor of the type shown in FIG. 1, equipped with an inner guiding ring according to the prior art.

FIG. 2 shows the installation of the blades of the rectifier with an inner guiding ring system according to the prior art. The blade 6, shown in FIG. 2, is mounted so it can be pivoted about a substantially radial axis R. To adapt its pitch, the blade 6 is mounted on the outer casing 7 of the compressor 3 by a pivot 8 which is driven in rotation by means not shown. At its radially inner end, the blade 6 is mounted on a pivot shaft 9 also centered on the axis R of rotation of the blade 6. A radially inner guiding ring 10 comprises a radial orifice with a sleeve 11 in which the pivot shaft 9 of the blade 6 is inserted into a pivot connection. In this way, the guiding ring 10 allows the blade 4 to rotate around its axis R and keeps this axis in position. It also provides a structural function to hold the annular row of blades 6 of the rectifier.

Here, the guiding ring 10 according to the prior art comprises an inner cylindrical tab with a bolted connection 12 to support an inner crown 13 supporting an abradable 14 which cooperates with lips 15 mounted on a ferrule 16 of the rotor of the compressor, to ensure axial sealing under the guiding ring 10. This device has a significant radial extension, partly due to a bolted connection 12 between the part of the ring receiving the pivot shafts 9 of the blades 6 and the inner crown 13 supporting the abradable 14.

Figure 3:
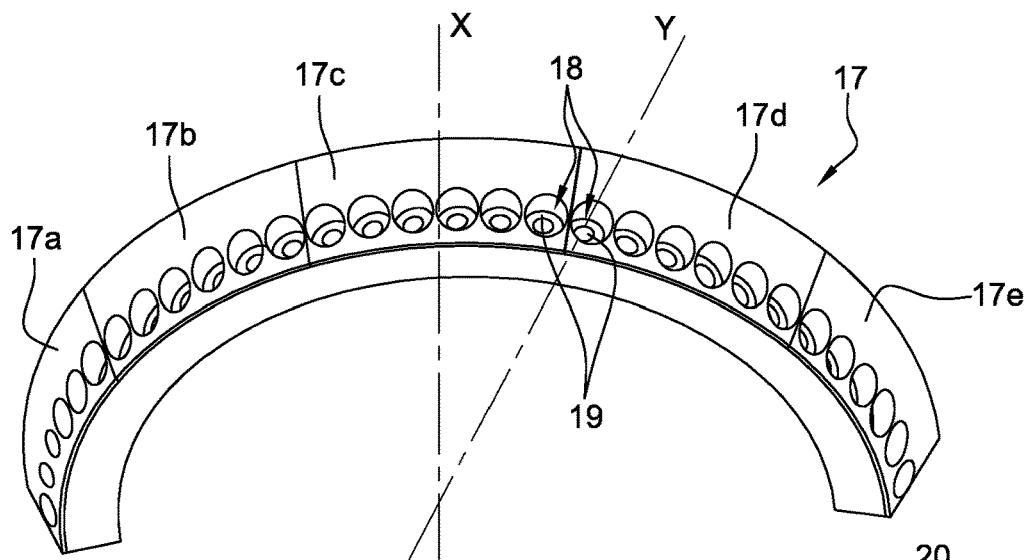
FIG. 3 shows an external view in perspective of an assembly of several angular sectors of an inner guiding ring according to one embodiment.

As shown in FIG. 3, the guiding ring 17 according to the present disclosure is manufactured in several circumferential sectors around its axis of symmetry X. FIG. 3 shows the angular sector of the guiding ring 17, which includes several sub-sectors 17a, 17b, 17c, 17d, 17e, which have been assembled. An annular row of radial orifices 18 are equipped with sleeves 19 to receive the pivot shafts 9 of the blades 6 described above.

Figure 4:
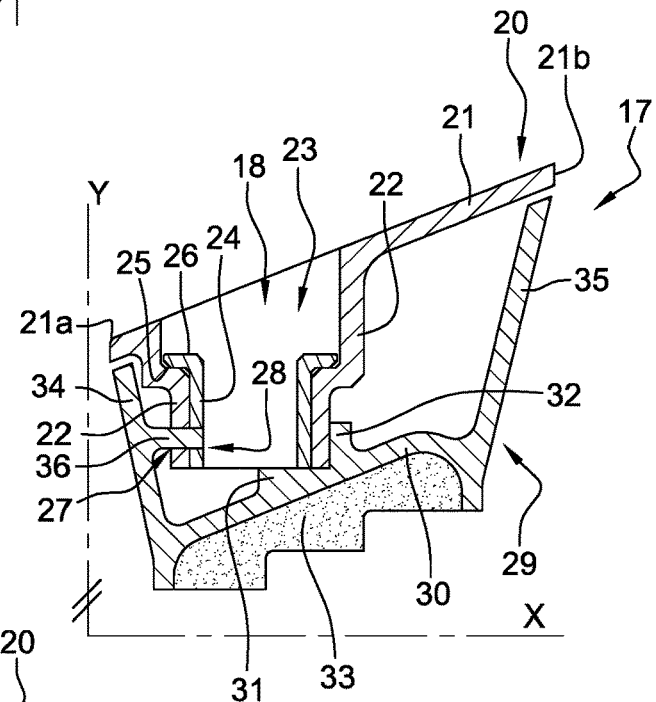
FIG. 4 shows an axial section of an angular sector of an inner guiding ring according to an embodiment.
Figure 5:
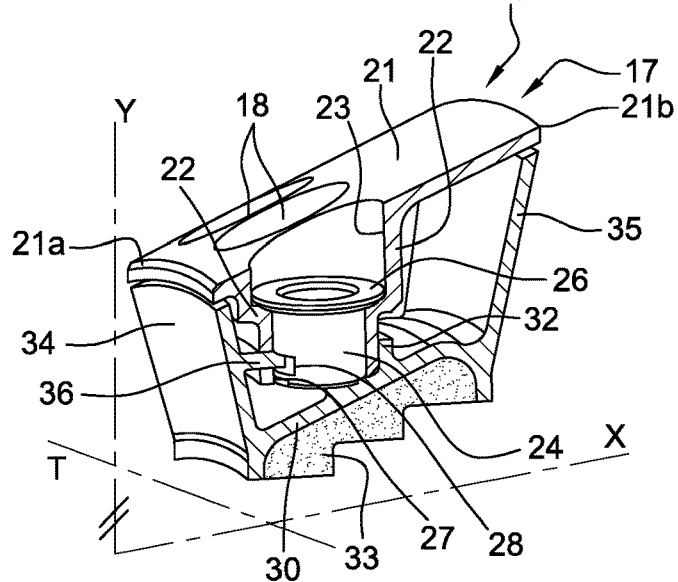
FIG. 5 represents the same angular sector of an inner guiding ring according to the embodiment shown in FIG. 4, seen in perspective and cut according to an axial plane at a receiving orifice of a blade axle, with a sleeve for holding the blade axle installed in the orifice.

Referring to FIGS. 4 and 5, each sub-sector of the ring 17 comprises a corresponding sector of a ferrule 20 which essentially comprises a platform 21 substantially frustoconical. The radially outer surface of the platform is shaped to define an inner wall of the flow path of the compressor 3 at the rectifier between a first axial end 21a and a second axial end 21b. In FIGS. 4 and 5, the first axial end 21a is on the left and the second axial end 21b is on the right.

The platform 21 is drilled to accommodate the row of radial orifices 18 to allow the pivot shafts 9 of blades to pass through. An annular structure 22 extending radially towards the inside of the platform 21 forms the walls 23 of orifices 18. These walls 23 have a circular cross-section around the radial axis Y of each orifice 18. Each orifice 18 has a part forming a housing in which is inserted a cylindrical sleeve 24 of circular cross-section about the same radial axis Y, intended to receive the pivot shaft 9 of a blade 6 in a pivoting connection. The walls 23 of each orifice 18 have a shoulder 25 on which a circular flange 26 is supported at the radially upper end of the sleeve 24, so that the latter is radially positioned when inserted into the orifice 18 in translation in the radial direction Y. The position of the shoulder 25 is defined so the radial position of the inner radial end of the orifices 18 corresponds to the radial position of the inner radial end of the sleeves 24 when in position, their flange 26 being placed on the shoulder 25.

In some embodiments, the assembly is configured so the annular structure 22 equipped with the sleeves 24 in the orifices 18 stops radially at the inner radial end of the pivot shafts 9 of the blades 6, to limit the radial dimensions of the ferrule 20.

A cylindrical groove 27 is formed in the transverse wall at a first axial end of the annular structure 22, located on the side of the first axial end 21a of the platform 21, to the left of the orifices 18 in the FIG. 4. The axial depth of the cylindrical groove 27 is arranged so it partially crosses the wall 23 of the orifices 18, thus having an opening in the orifices 18. Circumferentially, the cylindrical groove 27 is open at least on one lateral side of the ferrule angular sector 20.

In some embodiments, each sleeve 24 also comprises a transverse notch 28 which is made on a part of a cylindrical wall of each sleeve 24. The notch 28 has the same radial thickness as the cylindrical groove 27 of the annular structure 22 of the ferrule sector 20. In addition, to the notch 28 faces the opening of the cylindrical groove 27 in the wall 23 of the orifice 18 when the sleeve 24 is installed in the latter. The notch 28 passes through the cylindrical wall of the sleeve 24. The notch 28 therefore forms an opening of a given length in the cylindrical wall of the sleeve 24, closed at both ends by the wall. The notch 28 of the sleeve has a depth and length adapted so when the sleeve 24 is turned in the orifice 18 to place its notch 28 facing the passage of the cylindrical groove 27 in the annular structure 22, the assembly forms a cylindrical groove of constant depth for the ferrule sector 20 equipped with the sleeves 24.

The angular ring sector 17 shown in the FIG. 3 corresponds to a crown sector 29 around which the ferrule sectors 20 corresponding to sub-sectors 17a to 17e are mounted. As best shown in FIGS. 4 and 5, the crown sector 29 comprises a rim sector 30, the radially outer wall of which includes a radially outer cylindrical surface 31, forming a radial stop, arranged to cooperate with the inner radial end of the annular structure 22 supporting the orifices 18, to position it radially. It also comprises a radially outer annular surface 32, forming an axial stop cooperating with a transverse wall of the annular structure 22, to position it axially with respect to the ferrule sector 29. The transverse wall of the annular structure 22 faces towards the second axial end 21b of the platform 21, to the right in the figures.

The radially inner face of the rim 30 comprises an inner cylindrical gutter which forms the housing for a seal 33 made of an abradable material that cooperates with complementary elements of a rotor ferrule to form an axial seal under the inner guiding ring 17 of the rectifier.

At its axial end corresponding to the first axial end 21a of the platform 21, on the left in the figures, the rim 30 supports a first transverse wall 34 which extends radially to axially close the passage between the rim 30 and the first axial end 21a of the platform 21. The first transverse wall 34 is substantially cylindrical or frustoconical.

At its axial end corresponding to the second axial end 21b of the platform 21, on the right in the figures, the rim 30 supports a second transverse wall 35 which extends radially to axially close the passage between the rim 30 and the second axial end 21b of the platform 21. The second transverse wall 35 is substantially cylindrical or frustoconical.

The radial stop 31 on the rim 30 is configured so the first transverse wall 34 and the second transverse wall 35 form an annular space in which the annular structure 22 with orifices 18 is inserted, when the first 21a and the second 21b of the axial ends of the platform 21 contact the transverse walls.

In some embodiments, the first transverse wall 34 supports a cylindrical tab 36 directed towards the second transverse wall 35, to the right in the figures, radially positioned facing the cylindrical groove 27 of the ferrule sector and having a thickness allowing it to be inserted into the groove. In some embodiments, the axial distance between the free end of the cylindrical tab 36 and the axial stop 32 on the rim 30 of the crown sector 29 corresponds to the axial distance between the bottom of the cylindrical groove 27 and the transverse support wall of the stop 32 on the ferrule sector 20.

Thus, the cooperation of the two stops of the rim 30, one axial 32 and the other radial 31, with the insertion of the cylindrical tab 36 of the crown sector 29 into the cylindrical groove 27 of the ferrule sector 20 keeps the sectors integral in the radial and axial directions to form the sub-sector 17a of the corresponding guiding ring 17. The engagement of the cylindrical tab 17 holds radially in place the sleeves 24 in the orifices 18 and immobilizes the sleeves in rotation because the ends of the transverse notch 28 in the walls of the sleeves 24 stop on the axial edge of the tab 27.

In this way, the connections between the ferrule sector 20 and the inner crown sector 29 position the latter with respect to each other in the axial X and radial Y directions but leave them free to rotate with respect to each other about the axis X of the ring. The two sectors are therefore mounted sliding circumferentially.

The guiding ring sector 17 represented in FIG. 3 therefore consists of an inner crown sector 29 supporting a seal 33, five ferrule sectors 20 corresponding to the five sub-sectors, 17a to 17e, and a set of sleeves 24 corresponding to the quantity of orifices 18 intended to accommodate them on the ferrule sectors 20.

The method for assembling a guiding ring sector 17 involves the following steps.

In a first step, the sleeves 24 are mounted in the orifices 18 of each ferrule sector 20 by introducing them by radial translation via the orifices 18 in the platform 21 and rotating them in their housing to match their notch 28 with the cylindrical groove 27 existing in the first wall of the annular structure 22.

In a second step, each ferrule sector 20 is successively mounted by circumferential sliding around the crown sector 29, to bring it into the position corresponding to the corresponding sub-sector, 17a to 17e. To do this, each ferrule sector 20 is successively presented laterally around the crown sector 29 to match the lateral opening of the cylindrical groove 27 with the cylindrical tab 36, as well as the stops 31, 32, present on the rim 30 with the corresponding walls of the annular structure 22. The ferrule sector 20 is then slid circumferentially relative to the crown sector 29 to bring it into position. As it sinks into the cylindrical groove 27, the cylindrical tab 36 successively meets the sleeves 24 present in the orifices 18. If the sleeves 24 are not exactly in place, they can easily be rotated so their notches 28 open the way to the cylindrical tab 36 during sliding. When the two sectors 20, 29 are positioned relative to each other in all directions, the sleeves 24 are immobilized, both in rotation about their axis of revolution Y and radially by the presence of the annular tab 36.

FIG. 3 shows an embodiment in which a crown sector 29 supports five ferrule sectors 20 to form an angular sector of the inner guiding ring 17 which forms a half ring. These parameters may vary. The quantity of ferrule sectors supported by a crown sector to form a half ring is preferably between five and six. However, a crown sector may correspond to a smaller angular sector and support fewer ferrule sectors.

A method for assembling the compressor, the rotor of the compressor being already assembled, first comprises producing two half guiding rings, by assembling, on the example, five ring sectors 17a-17e as described above. The ring sectors may be assembled together by means of embedding or means of encasing.

Then, the two half-rings can be assembled around the compressor rotor to form the guiding ring 17 by placing it directly in the position it must occupy in the compressor 3 to receive the annular row of variable-pitch blades of the rectifier.

While illustrative embodiments have been illustrated and described, it will be appreciated that various changes can be made therein without departing from the spirit and scope of the disclosure.

The invention claimed is:

1. A ring for guiding variable-pitch blades and supporting an abradable coating for an aircraft turbomachine, the ring extending about an axis (X), the ring comprising:
    substantially radial orifices in which are mounted guiding sleeves each configured to receive a pivot of one of the blades;
    a radially inner crown divided into sectors and supporting the abradable coating; and
    a radially outer annular ferrule divided into sectors and the orifices for mounting the sleeves located in the outer ferrule, each ferrule sector mounted about a crown sector by a circumferential sliding connection, the crown sector comprising an immobilizer configured to immobilize in rotation the sleeves of the ferrule sector about the axis (X);
    wherein the immobilizer of each crown sector of the crown sectors comprises a cylindrical tab unitary with the respective crown sector and configured to be engaged in a transverse notch of the guiding sleeves of each ferrule sector mounted around the crown sector.

2. The ring according to claim 1, wherein the cylindrical tab cooperates with a complementary cylindrical groove provided in the ferrule sector, to form an element of the circumferential sliding connection of the ferrule sector around the crown sector.

3. The ring according to claim 1, wherein each crown sector comprises at least one of a cylindrical wall and a frustoconical wall, the at least one wall being configured to support the abradable coating which is connected by a first axial end to a first annular wall and by a second axial end to a second annular wall, the cylindrical tab being supported by the first annular wall and extending towards the second annular wall.

4. The ring according to claim 3, wherein the first and second annular walls define an annular space in which the ferrule sectors are at least partially housed.

5. The ring according to claim 1, wherein a quantity of crown sectors is less than a quantity of ferrule sectors, and at least two ferrule sectors are mounted on each crown sector.

6. The ring according to claim 5, wherein the crown comprises two semi-circular crown sectors and the ferrule comprises at least six ferrule sectors, wherein at least three of the at least six ferrule sector is supported by each crown sector.

7. The ring according to claim 5, wherein the crown comprises two semi-circular crown sectors and the ferrule comprises at least ten ferrule sectors, wherein at least five of the at least ten ferrule sectors are supported by each crown sector.

8. The ring according to claim 1, wherein each crown sector comprises at least one of a radially outer cylindrical surfaces and a radial annular support surface configured to cooperate with one or more complementary annular surfaces of each ferrule sector.

9. The ring according to claim 1, wherein each crown sector comprises a radially outer cylindrical surface and a radial annular support surface configured to cooperate with one or more complementary annular surfaces of each ferrule sector.

10. A method of mounting a ring according to claim 1, comprising the steps of:
    mounting the sleeves in the orifices of the ferrule sectors,
    mounting the ferrule sectors by circumferential sliding around the crown sectors, to ensure that the sleeves are in rotational immobilization about their axes of revolution.

11. The ring according to claim 3, wherein the at least one wall comprises a radially outer cylindrical surface forming a radial stop, arranged to cooperate with an inner radial end of an annular structure supporting the radial orifices and a radially outer annular surface forming an axial stop cooperating with a transverse wall of the annular structure supporting the radial orifices, the axial and radial stop being arranged between the first and second annular walls.

* * * * *

UNITED STATES PATENT AND TRADEMARK OFFICE
CERTIFICATE OF CORRECTION

PATENT NO. : 11,149,571 B2
APPLICATION NO. : 16/541757
DATED : October 19, 2021
INVENTOR(S) : T. Delahaye et al.

It is certified that error appears in the above-identified patent and that said Letters Patent is hereby corrected as shown below:

On the Title Page

Item (72)   Line 4   change "Delphine Hermanee Maxime Parent" to
-- Delphine Hermance Maxime Parent --

Signed and Sealed this
Eleventh Day of October, 2022

Katherine Kelly Vidal
*Director of the United States Patent and Trademark Office*